(12) United States Patent
Odawara et al.

(10) Patent No.: US 11,845,372 B2
(45) Date of Patent: Dec. 19, 2023

(54) TRANSPORT VEHICLE

(71) Applicant: Murata Machinery, Ltd., Kyoto (JP)

(72) Inventors: Tomoki Odawara, Inuyama (JP); Kotori Maki, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 494 days.

(21) Appl. No.: 17/267,874

(22) PCT Filed: Aug. 9, 2019

(86) PCT No.: PCT/JP2019/031756
§ 371 (c)(1),
(2) Date: Feb. 11, 2021

(87) PCT Pub. No.: WO2020/049960
PCT Pub. Date: Mar. 12, 2020

(65) Prior Publication Data
US 2021/0178953 A1    Jun. 17, 2021

(30) Foreign Application Priority Data
Sep. 7, 2018  (JP) .................. 2018-167683

(51) Int. Cl.
*B60P 1/02*    (2006.01)
(52) U.S. Cl.
CPC ..................... *B60P 1/02* (2013.01)
(58) Field of Classification Search
CPC .. B60P 1/02; B60P 1/027; B60P 3/007; B66F 3/02; B66F 9/063; B61B 13/00; B62B 3/00; B62B 3/06; G05D 2201/0216
See application file for complete search history.

(56) References Cited

U.S. PATENT DOCUMENTS

2007/0288123 A1* 12/2007 D'Andrea .............. G05D 1/021
700/214
2009/0014219 A1   1/2009 Springston et al.
(Continued)

FOREIGN PATENT DOCUMENTS

CN    102381663 A    3/2012
CN    20354403 U    10/2013
(Continued)

OTHER PUBLICATIONS

Second Office Action dated Nov. 28, 2022, of counterpart Chinese Patent Application No. 2019004774.0, along with a Google machine translation in English.
(Continued)

*Primary Examiner* — Paul N Dickson
*Assistant Examiner* — Matthew D Lee
(74) *Attorney, Agent, or Firm* — DLA Piper LLP (US)

(57) ABSTRACT

A transport vehicle includes a pair of left and right vehicle body frames extending in a front and back direction; driving wheels disposed at a middle portion in the front and back direction of the pair of left and right vehicle body frames; auxiliary wheels disposed at a lower portion of an end portion in the front and back direction of each of the right and left vehicle body frames; lifter mechanisms disposed at an upper portion of an end portion in the front and back direction of each of the right and left vehicle body frames; a connection frame connecting upper portions of the right and left vehicle body frames to each other; and a lower frame disposable between the right and left vehicle body frames, the lower frame being removably fixed at lower portions of the right and left vehicle body frames.

12 Claims, 8 Drawing Sheets

(56) References Cited

U.S. PATENT DOCUMENTS

| | | | |
|---|---|---|---|
| 2016/0167557 A1* | 6/2016 | Mecklinger | B60P 1/02 414/812 |
| 2018/0065258 A1* | 3/2018 | Liu | B25J 19/023 |
| 2018/0099810 A1* | 4/2018 | Wu | B25J 5/007 |
| 2018/0099811 A1* | 4/2018 | Shen | B66F 3/08 |
| 2019/0129399 A1* | 5/2019 | Wagner | B65G 1/0471 |
| 2019/0295591 A1* | 9/2019 | Pajevic | B66F 9/063 |
| 2022/0259023 A1* | 8/2022 | Iwamoto | B66F 9/063 |
| 2022/0259024 A1* | 8/2022 | Itozawa | B66F 9/063 |
| 2023/0075455 A1* | 3/2023 | Zahdeh | B65G 1/1373 |
| 2023/0191589 A1* | 6/2023 | Lee | B66F 9/205 414/373 |

FOREIGN PATENT DOCUMENTS

| | | | | |
|---|---|---|---|---|
| CN | 104786236 A | | 7/2015 | |
| CN | 105417434 A | | 3/2016 | |
| CN | 105836669 A | * | 8/2016 | |
| CN | 107032260 A | * | 8/2017 | |
| CN | 107223105 A | | 9/2017 | |
| CN | 206569154 U | | 10/2017 | |
| CN | 206692286 U | | 12/2017 | |
| CN | 108275620 A | * | 7/2018 | B66F 7/14 |
| JP | 62-6068 U | | 1/1987 | |
| JP | 05-032107 U | | 4/1993 | |
| JP | 08-207754 A | | 8/1996 | |
| JP | 09-272430 A | | 10/1997 | |
| JP | 2007048157 A | * | 2/2007 | B66F 9/063 |
| JP | 2011-088500 A | | 5/2011 | |
| JP | 2011-240781 A | | 12/2011 | |
| JP | 2014-184749 A | | 10/2014 | |
| JP | 3209869 U | | 4/2017 | |
| JP | 2018-034932 A | | 3/2018 | |
| JP | 2020090364 A | * | 6/2020 | |
| WO | 2013/001906 A1 | | 1/2013 | |
| WO | WO-2021125419 A1 | * | 6/2021 | B66F 9/065 |

OTHER PUBLICATIONS

Office Action dated Mar. 29, 2023, of counterpart Chinese Patent Application No. 201980047774.0, along with an English machine translation.

Office Action dated Dec. 26, 2022, of counterpart Taiwanese Patent Application No. 108131533, along with an English machine translation.

* cited by examiner

TRANSPORT VEHICLE

TECHNICAL FIELD

This disclosure relates to a transport vehicle, especially to a transport vehicle having a lifter.

BACKGROUND

Conventionally, a transport vehicle having a lifter has been known (refer to WO 2013/001906 A1, for example). WO '906 discloses a fork lift 2, for example. The fork lift 2 includes a pair of right and left side frames 4, 6, and a rear frame 8.

A conventional transport vehicle with a lifter can transport a heavy article (about 1000 kg, for example) while lifting up the article. It is necessary to reinforce the main frame to deal with the heavy load, but the reinforcement of the main frame enlarges the body. Body enlargement increases the whole weight of the transport vehicle so that it is necessary to enlarge the batteries and the motors as well.

In addition, since a conventional transport vehicle with a lifter includes a main frame and a frame for a lifter as different members, the doubled frames cause a useless space for ensuring attachment portions.

It could therefore be helpful to provide a way to downsize a transport vehicle with a lifter.

SUMMARY

We Thus Provide:

A transport vehicle includes a pair of right and left vehicle body frames, driving wheels, auxiliary wheels, and lifter mechanisms.

The pair of left and right vehicle body frames extends in a front and back direction.

Each of the driving wheels are disposed at a middle portion in the front and back direction of the pair of left and right vehicle body frames. The total number of the driving wheels is two.

Each of the auxiliary wheels are disposed at a lower portion of an end portion in the front and back direction of each of the right and left vehicle body frames. The total number of the auxiliary wheels is four.

Each of the lifter mechanisms are disposed at an upper portion of an end portion in the front and back direction of each of the right and left vehicle body frames. The total number of the lifter mechanisms is four.

According to the transport vehicle, portions on which the lifter mechanisms are placed are the frame, which supports the driving wheels and the auxiliary wheels. Accordingly, it is possible to integrate the lifter mechanisms with the frame, thereby manufacturing the transport vehicle attaining downsizing and light weighting.

In addition, according to the transport vehicle, since the lifter mechanisms and the auxiliary wheels are provided at the end portions in the front and back direction of each of the vehicle body frames, the lifter mechanisms are disposed in the vicinity of the auxiliary wheels. Accordingly, the heavy load is unlikely to be applied to a portion of the frame other than ends thereof, thereby manufacturing the transport vehicle attaining downsizing and light weighting.

The locations of the auxiliary wheels and the lifter mechanisms may correspond to each other or may be different form each other in planar view.

The transport vehicle may further include a connection frame and a lower frame.

The connection frame connects upper portions of the pair of right and left vehicle body frames with each other.

The lower frame may be able to be disposed between the pair of right and left vehicle body frames. The lower frame may be removably fixed at lower portions of the pair of right and left vehicle body frames.

According to the transport vehicle, since the vehicle body frame and the lower frame constitute a dividing structure, it is easy to access components installed inside of the transport vehicle.

The connection frame may connect middle portions in the front and back direction of the pair of right and left vehicle body frames with each other.

According to the transport vehicle, which has a frame with a simple structure, enough strength is obtained. Especially, when the transport vehicle travels over a rough surface of the floor and a large force is partially applied, the stress is distributed because the pair of right and left vehicle body frames are connected with each other only at the middle portions in the front and back direction so that the whole body is likely to bend.

Each of the lifter mechanisms may include an elevating motor, an elevating transmission shaft, and a bearing.

The elevating motor may be disposed at an upper portion of each of the right and left vehicle body frames or the connection frame.

The elevating transmission shaft is elevated by driving of the elevating motor.

The bearing supports the elevating transmission shaft such that the elevating transmission shaft can move in the vertical direction.

According to the transport vehicle, the elevating motor is supported by the vehicle body frame or the connection frame too, thereby making smaller the transport vehicle.

The transport vehicle may further include an electrical component disposed at an upper face of the lower frame. The electrical component may be located at a position different from that of the connection frame in planar view.

According to the transport vehicle, since the electrical component is disposed at a position different from that of the connection frame in planar view, it is possible to arrange at least parts of the electrical components and the connection frame at the same level, thereby making it possible to make the transport vehicle compact in the height direction.

The lower frame may be able to be removed below to leave as one member by itself from the pair of right and left vehicle body frames.

According to the transport vehicle, since the vehicle body frame and the lower frame constitute a dividing structure, it is possible to detach the lower frame and the electrical component below from the vehicle body frame with one action. In other words, maintainability is improved. In addition, when the assembly work is performed, it is possible to perform a process for the vehicle body frame and a process for the lower frame in parallel, thereby shortening the manufacturing time.

Each of the vehicle body frames may include a main portion that carries the lifter mechanisms, and a reinforcement portion extending below from the main body.

According to the transport vehicle, since the vehicle body frame has the reinforcement portion, strength is improved while maintaining a light weight.

Our transport vehicle with a lifter is thereby downsized.

REFERENCE SIGNS LIST

Figure 1:
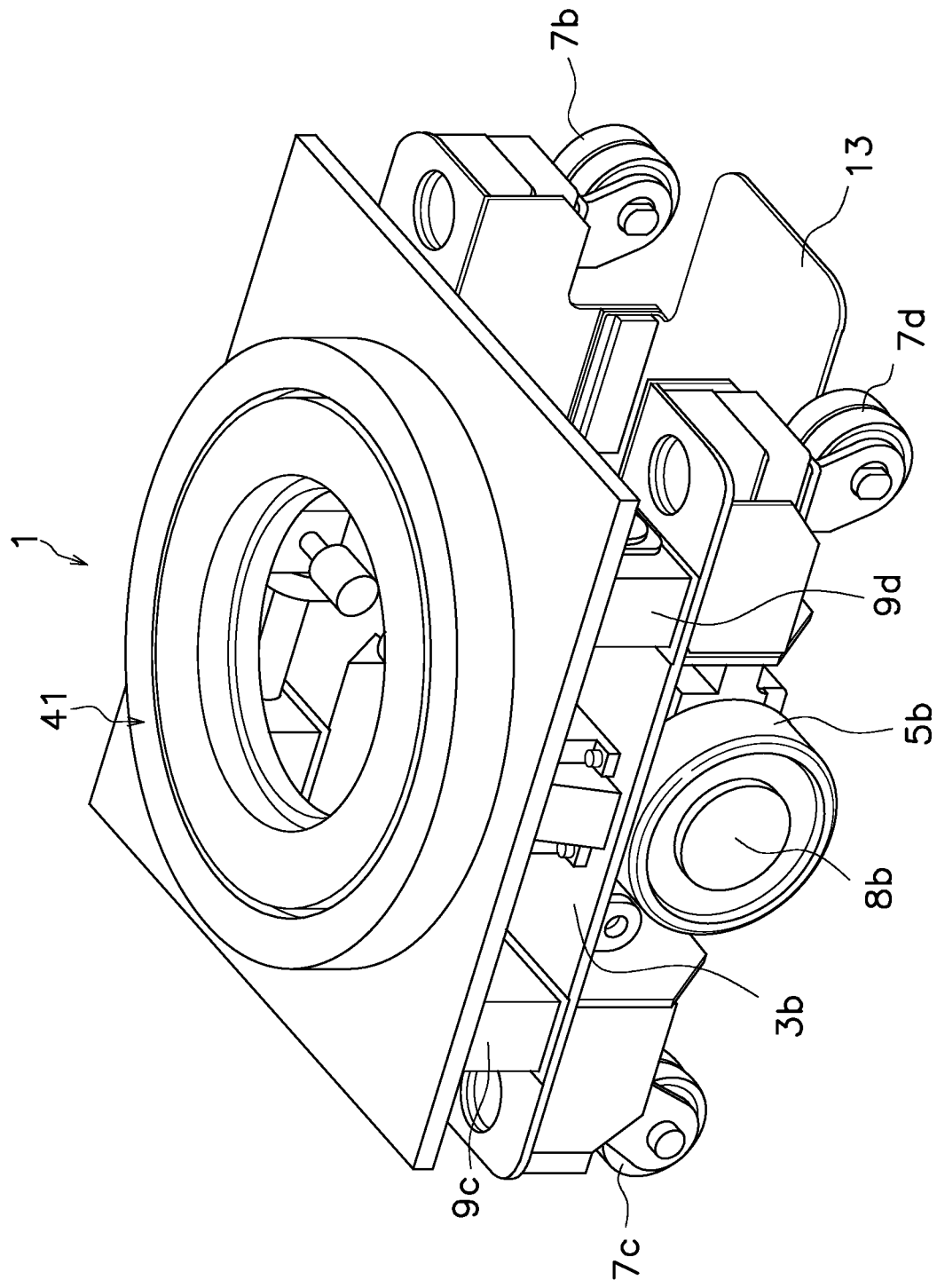
FIG. 1 is a schematic perspective view of the transport vehicle in a first example.

1: transport vehicle
3a: vehicle body frame
3b: vehicle body frame
4: upper portion frame
5a: driving wheel
5b: driving wheel
6: side frame
7a: auxiliary wheel
7b: auxiliary wheel
7c: auxiliary wheel
7d: auxiliary wheel
8a: travelling motor
8b: travelling motor
9a: lifter mechanism
9b: lifter mechanism
9c: lifter mechanism
9d: lifter mechanism
11: connection frame
13: lower frame
17: electrical component
21a: elevating motor
21b: elevating motor
22a: distribution mechanism
22b: distribution mechanism
23: elevating transmission shaft
23a: flat plate portion
24a: driving shaft
24b: driving shaft
24c: driving shaft
24d: driving shaft
25: bearing
26: housing
27: main body
28: rack
29: first reinforcement portion
30: pinion
31a: second reinforcement portion
31b: second reinforcement portion
33a: third reinforcement portion
33b: third reinforcement portion
41: turning table

DETAILED DESCRIPTION

1. First Example (1) Basic Configuration

Figure 2:
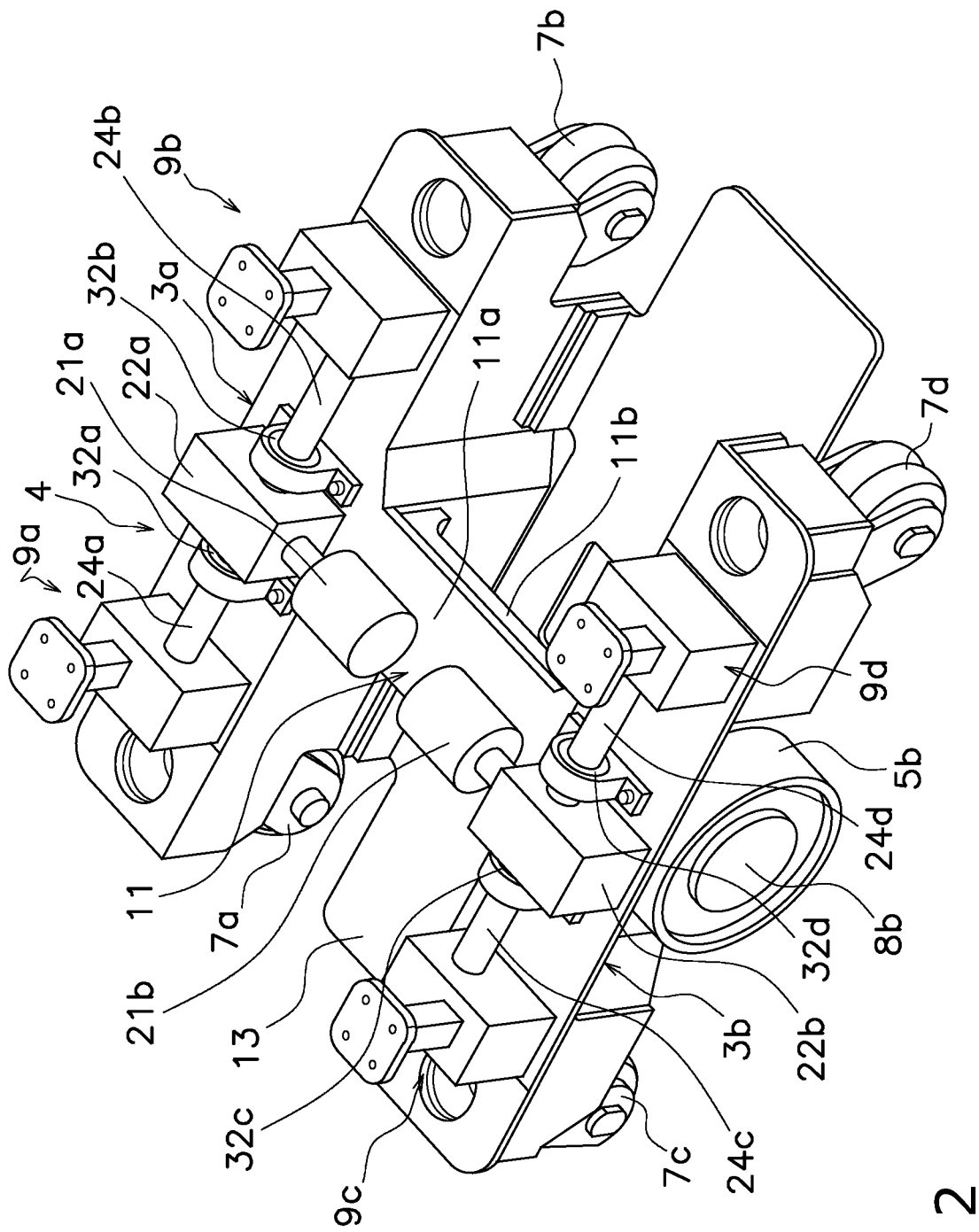
FIG. 2 is a schematic perspective view of the frame and the lifter mechanisms of the transport vehicle.
Figure 3:
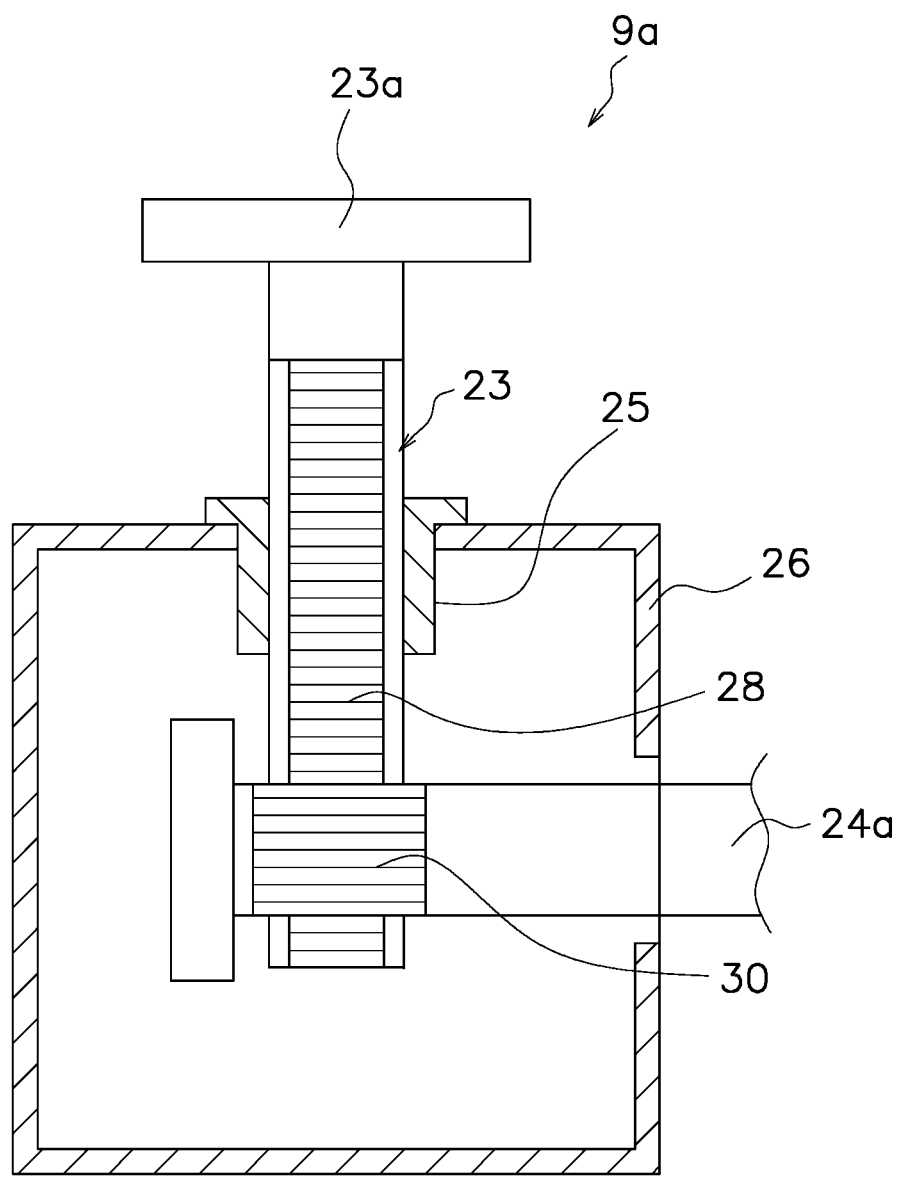
FIG. 3 is a schematic sectional view of the lifter mechanisms.

Referring to FIGS. 1 through 3, a basic configuration of a transport vehicle 1 will be explained. FIG. 1 is a schematic perspective view of the transport vehicle in the first example. FIG. 2 is a schematic perspective view of the frame and the lifter mechanisms of the transport vehicle. FIG. 3 is a schematic sectional view of the lifter mechanisms.

The transport vehicle 1 is a device for transporting an article. The transport vehicle 1 can transport the article to a transfer location and elevate it. In addition, the transport vehicle 1 can turn the article around a vertical axis. The transport vehicle 1 includes a pair of right and left vehicle body frames 3a, 3, driving wheels 5a, 5b, auxiliary wheels 7a, 7b, 7c, 7d, and lifter mechanisms 9a, 9b, 9c, 9d.

The right and left vehicle body frames 3a, 3b extend forward and backward in a first direction (front and back direction), and are located apart from each other in a second direction perpendicular to the front and back direction. The vehicle body frames 3a, 3b are composed of thin and flat members.

The driving wheels 5a, 5b are respectively disposed at middle portions in the first direction of the vehicle body frames 3a, 3b. Accordingly, the total number of the driving wheels is two. A direction to which the driving wheels 5a, 5b face is a travelling direction in the first direction. The transport vehicle 1 includes travelling motors 8a, 8b. The travelling motors 8a, 8b are direct drive type respectively installed in the driving wheels 5a, 5b. The travelling motor 8a is hidden and is not shown in the figures.

The auxiliary wheels 7a, 7b, 7c, 7d are disposed at lower portions of end portions in the first direction of the vehicle body frames 3a, 3b. Specifically, the auxiliary wheel 7a is disposed at a front end portion of the vehicle body frame 3a, the auxiliary wheel 7b is disposed at a back end portion of the vehicle body frame 3a, the auxiliary wheel 7c is disposed at a front end portion of the vehicle body frame 3b, and the auxiliary wheel 7d is disposed at a back end portion of the vehicle body frame 3b. The auxiliary wheel is a caster wheel, for example, and it can be turned around a vertical axis.

In this example, the auxiliary wheels 7a through 7d bear most of loads of the article and the transport vehicle 1 so that the load supported by one of the driving wheels 5a, 5b is about a fraction of load of one of auxiliary wheels 7a through 7d bear. The driving wheels 5a, 5b are urged below by springs (not shown), respectively.

The lifter mechanisms 9a through 9d are mechanisms that elevate the article. Specifically, the lifter mechanisms 9a through 9d are disposed at upper portions of end portions in the first direction of vehicle body frames 3a, 3b. More specifically, the lifter mechanism 9a is disposed at a front end portion of the vehicle body frame 3a, the lifter mechanism 9b is disposed at a back end portion of the vehicle body frame 3a, the lifter mechanism 9c is provided at a front end portion of the vehicle body frame 3b, and the lifter mechanism 9d is provided at a back end portion of the vehicle body frame 3b.

According to this example, each of the auxiliary wheels is located deviated outward in the first direction of each of the corresponding lifter mechanisms. Since the auxiliary wheel is located outside of the lifter mechanism, it is preferable because the support by the auxiliary wheel becomes stable.

The location of the auxiliary wheel may correspond to the location of the lifter mechanism in planar view, and may be deviated inward in the first direction. The auxiliary wheel may be deviated from the lifter mechanism in the second direction (and not in the first direction), and may be deviated from the lifter mechanism in both the first direction and the second direction. The advantage of deviating the auxiliary wheel from the lifter mechanism in planar view is to ensure a space in which the elevating transmission shaft of the lifter mechanism can move in the vertical direction.

As described above, the locations on which lifter mechanisms 9a through 9d are provided are the vehicle body frames 3a, 3b, which support the driving wheels 5a, 5b and the auxiliary wheels 7a through 7d. Accordingly, it is possible to integrate the lifter mechanisms 9a through 9d with the vehicle body frames 3a, 3b so that the transport vehicle 1 can be downsized and lightened.

According to the transport vehicle 1, in addition, since the lifter mechanisms 9a through 9d and the auxiliary wheels 7a through 7d are provided at the end portions in the first direction of the vehicle body frames 3a, 3b, the lifter mechanisms 9a through 9d are located in the vicinity of the auxiliary wheels 7a through 7d. Accordingly, a heavy load is unlikely to be applied to portions other than the end portions of the vehicle body frames 3a, 3b so that the transport vehicle 1 can be downsized and lightened.

Figure 4:
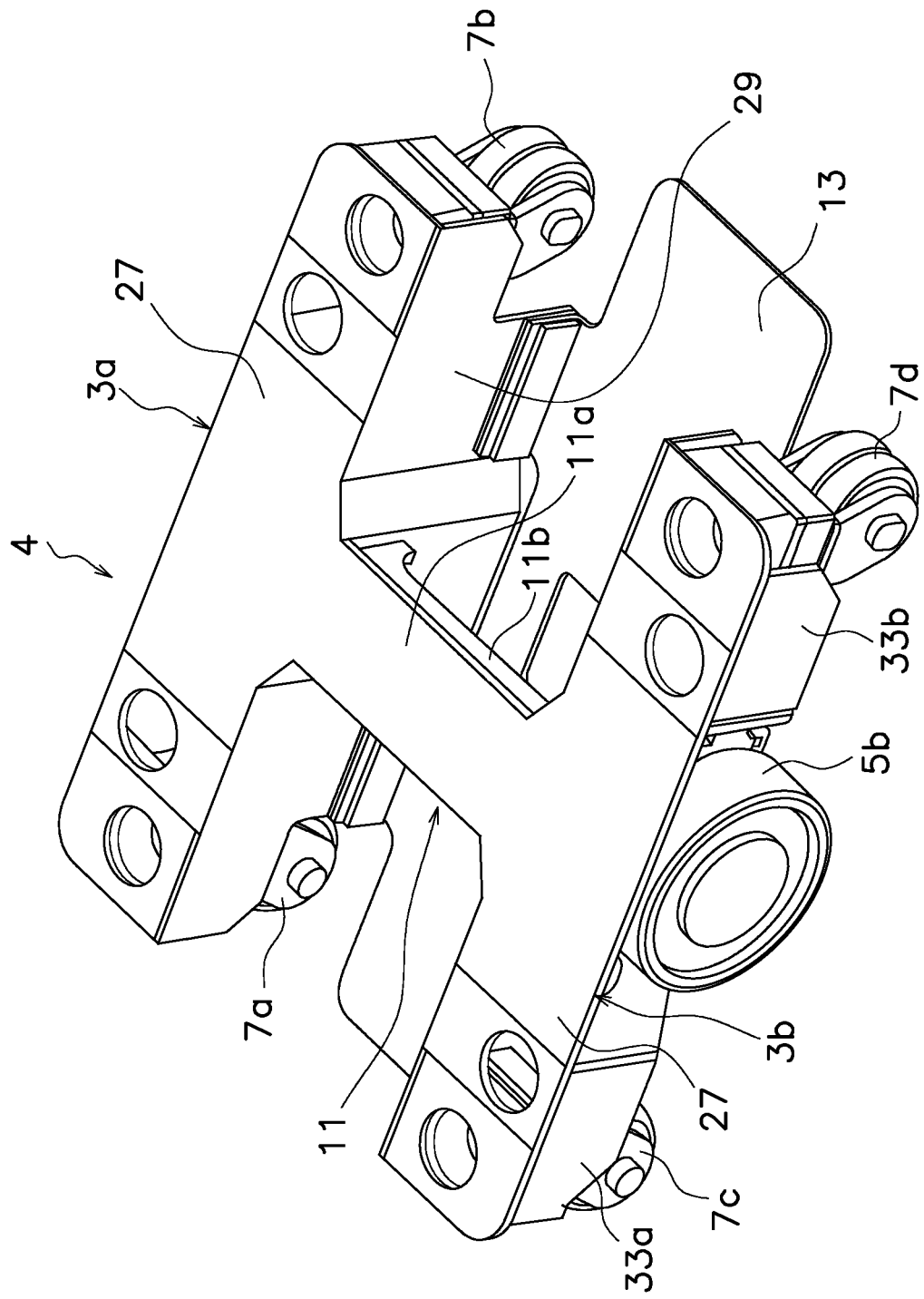
FIG. 4 is a schematic perspective view of the frame of the transport vehicle.
Figure 5:
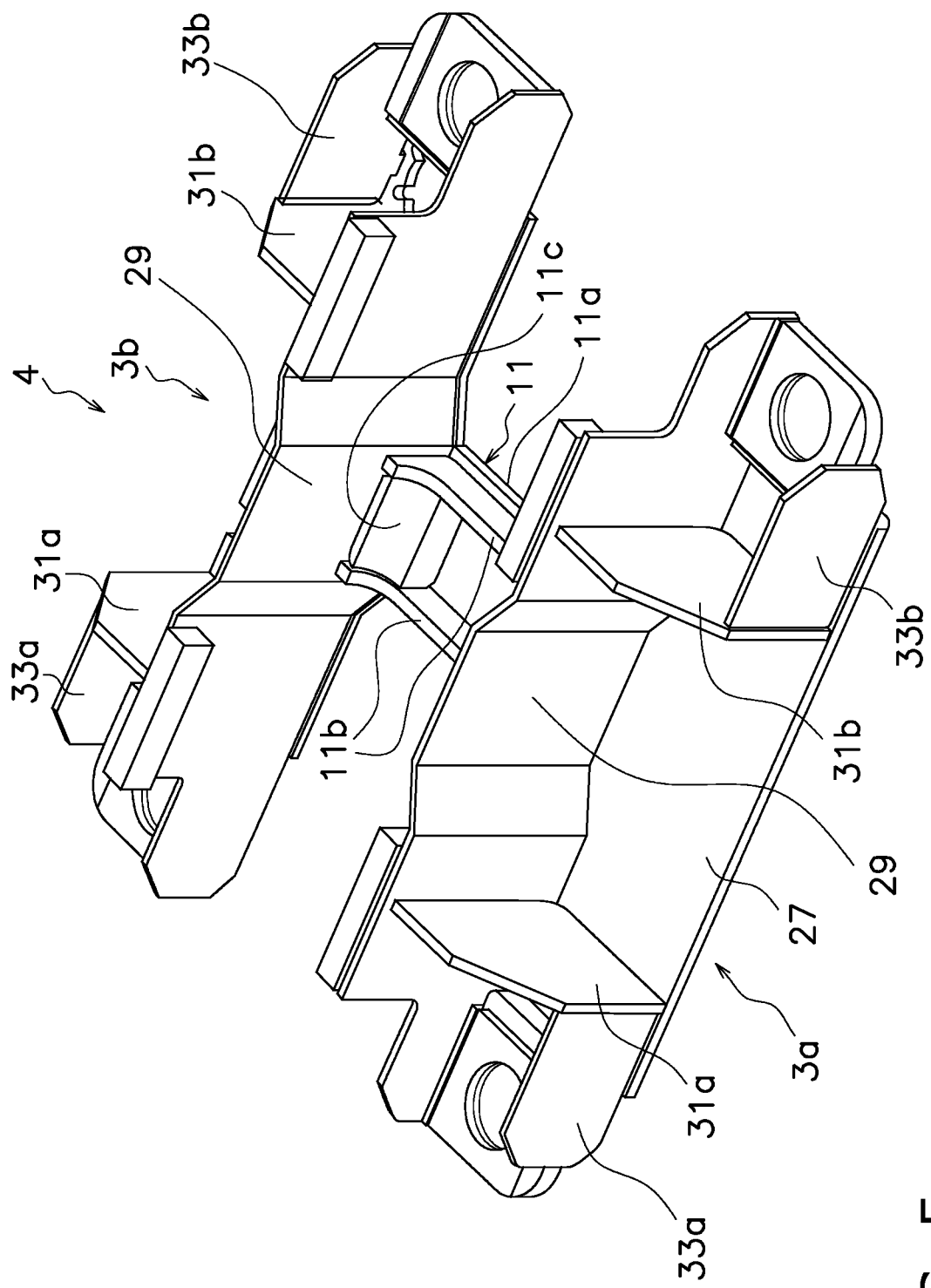
FIG. 5 is a schematic perspective view of the frame viewed from below.

The transport vehicle 1 further includes a connection frame 11. The connection frame 11 is a thin and flat member, and connects upper portions of the pair of right and left vehicle body frames 3a, 3b with each other. Specifically, the connection frame 11 has a thin and flat portion 11a extending in the second direction and is continuous with upper faces of the pair of right and left vehicle body frames 3a, 3b, as shown in FIGS. 4 and 5.

The connection frame 11 includes, other than the thin and flat portion 11a, other members that reinforce the pair of right and left vehicle body frames 3a, 3b. For example, the connection frame 11 further includes a pair of ribs 11b. The pair of ribs 11b is a thin and flat member fixed to lower portion at both ends in the first direction of the thin and flat portion 11a, and extends in the second direction. Both ends in the second direction of the pair of ribs 11b are fixed to the side faces of the upper portion of a first reinforcement portions 29 (later described). In addition, the connection frame 11 includes a reinforcement member 11c. The reinforcement member 11c is located at the lower portions of both ends in the second direction of the thin and flat portion 11a such that the reinforcement member 11c is located between the pair of ribs 11b. The reinforcement member 11c are fixed to the thin and flat portion 11a and the pair of ribs 11b, and are further fixed to the first reinforcement portion 29.

Accordingly an H-shaped upper portion frame 4 is constituted of the pair of right and left vehicle body frames 3a, 3b and the connection frame 11.

According to the above-described structure, the upper portion frame 4, which is constituted of the pair of the vehicle body frames 3a, 3b and the connection frame 11, defines openings facing upwardly. As a result, it is easy to adjust or replace electrical components 17 (later described). In contrast, if a frame of the lifter mechanism is provided on the frame of the vehicle as before, the frame of the lifter mechanism hinders the access to the components installed inside.

According to the above-described structure, the connected portions by the connection frame 11 are the middle portions in the first direction of the pair of right and left vehicle body frames 3a, 3b. Accordingly, in the transport vehicle 1, which has a frame with a simple structure, enough strength is obtained. Especially when the transport vehicle 1 travels along a rough surface of the floor so that a large force is partially applied thereto, the stress is distributed because the pair of right and left vehicle body frames 3a, 3b are connected only at the middle portions in the first direction thereof so that the whole body is likely to bend.

In addition, since the lifter mechanisms 9a through 9d are provided at four corners of the transport vehicle 1 in planar view (corners of the H-shaped upper portion frame 4), a large space is defined between the pair of right and left vehicle body frames 3a, 3b. Accordingly, it is easy to locate the electrical components 17 (later described).

The transport vehicle 1 includes elevating motors 21a, 21b as devices to drive a part or the whole of the lifter mechanisms. The elevating motors 21a, 21b are provided on the connection frame 11.

The transport vehicle 1 includes distribution mechanisms 22a, 22b that respectively distribute power of the elevating motors 21a, 21b into two directions.

The transport vehicle 1 includes driving shafts 24a, 24b that extend from the distribution mechanism 22a respectively to the lifter mechanisms 9a, 9b. The driving shafts 24a, 24b are rotatably supported respectively by bearings 32a, 32b provided on an upper face of the vehicle body frame 3a.

The transport vehicle 1 includes driving shafts 24c, 24d that extend from the distribution mechanism 22b respectively to the lifter mechanisms 9c, 9d. The driving shafts 24c, 24d are rotatably supported respectively by bearings 32c, 32d provided on an upper face of the vehicle body frame 3b.

As a sample of the lifter mechanisms, a structure of the lifter mechanism 9a will be explained. As shown in FIG. 3, the lifter mechanism 9a includes an elevating transmission shaft 23. The elevating transmission shaft 23 is an elevating member, and extends long in the vertical direction. The elevating transmission shaft 23 includes a flat plate portion 23a on an upper portion thereof. The elevating transmission shaft 23 is supported by a bearing 25 supported by a housing 26 of the lifter mechanism 9a such that the elevating transmission shaft 23 can move vertically but cannot rotate.

The elevating transmission shaft 23 includes a rack 28 extending in the vertical direction on a side face thereof. The driving shaft 24a includes a pinion 30 engaged with the rack 28. Accordingly, rotation of the elevating motor 21a elevates the elevating transmission shaft 23.

According to the transport vehicle 1, since the elevating motors 21a, 21b are supported by the upper portion frame 4 too, it is possible to further downsize the transport vehicle 1.

The transport vehicle 1 includes a lower frame 13. The lower frame 13 is disposed between the pair of right and left vehicle body frames 3a, 3b, and removably fixed to lower portions of the pair of right and left vehicle body frames 3a, 3b. Specifically, the lower frame 13 is "a flat and rectangular, thin plate member," and is fixed to inner portions in the second direction of the vehicle body frames 3a, 3b by screws (not shown). According to the transport vehicle 1, as described above, since the vehicle body frames 3a, 3b and the lower frame 13 constitute a dividing structure, it is easy to access the electrical components 17 (later described).

The transport vehicle 1 includes electrical components 17. The electrical components 17 are located on an upper face of the lower frame 13, but the positions of the electrical components 17 are different from that of the connection frame 11 in planar view. The electrical components 17 include batteries and motor drivers, for example.

The transport vehicle 1 includes a turning table 41. The turning table 41 is a device that rotates an article (not shown) around the vertical axis. The turning table 41 is provided on the upper sides of the lifter mechanisms 9a through 9d.

(2) Detailed Explanation of the Frames

Referring to FIGS. 4 and 5, a structure of the vehicle body frames will be explained in detail. FIG. 4 is a schematic perspective view of the frames of the transport vehicle. FIG. 5 is a schematic perspective view of the frames viewed from below.

Each of the vehicle body frames 3a, 3b includes a main body 27 having a horizontal surface and extending in the front and back direction, and a first reinforcement portion 29 extending below from the main body 27.

According to the transport vehicle 1, since each of the vehicle body frames 3a, 3b includes the first reinforcement portion 29, the strength is improved while keeping the light weighting.

More specifically, the first reinforcement portion 29 is a thin and flat member functioning as a rib, and extends below from almost the whole of the inner edge in the second direction of the main body 27. The lower frame 13 is fixed to a lower edge of the first reinforcement portion 29.

More specifically, each of the vehicle body frames 3a, 3b has second reinforcement portions 31a, 31b. The second reinforcement portions 31a, 31b are thin and flat members functioning as ribs, and are provided below the vehicle body frames 3a, 3b at positions close to and inward in the first direction from portions on which the lifter mechanisms 9a through 9d are provided. The second reinforcement portions 31a, 31b extend below from the main body 27, and extend from the first reinforcement portion 29 to the opposite edge in the second direction.

More specifically, each of the vehicle body frames 3a, 3b includes third reinforcement portion 33a, 33b. The third reinforcement portions 33a, 33b are thin and flat members functioning as ribs, and are located below the vehicle body frames 3a, 3b at positions close to and outward in the second direction from portions on which the lifter mechanisms 9a through 9d are provided. The second reinforcement portions 31a, 31b extend below from the main body 27, and extend outward in the first direction from the outer edge in the second direction of the second reinforcement portions 31a, 31b.

As described above, the first reinforcement portion 29, the second reinforcement portion 31a, and the third reinforcement portion 33a are located to encompass a portion on which the lifter mechanisms 9a through 9d are provided. Accordingly, the rigidity of the vehicle body frames 3a, 3b around the lifter mechanisms 9a through 9d is higher.

(3) Layout of the Electrical Components

Figure 6:
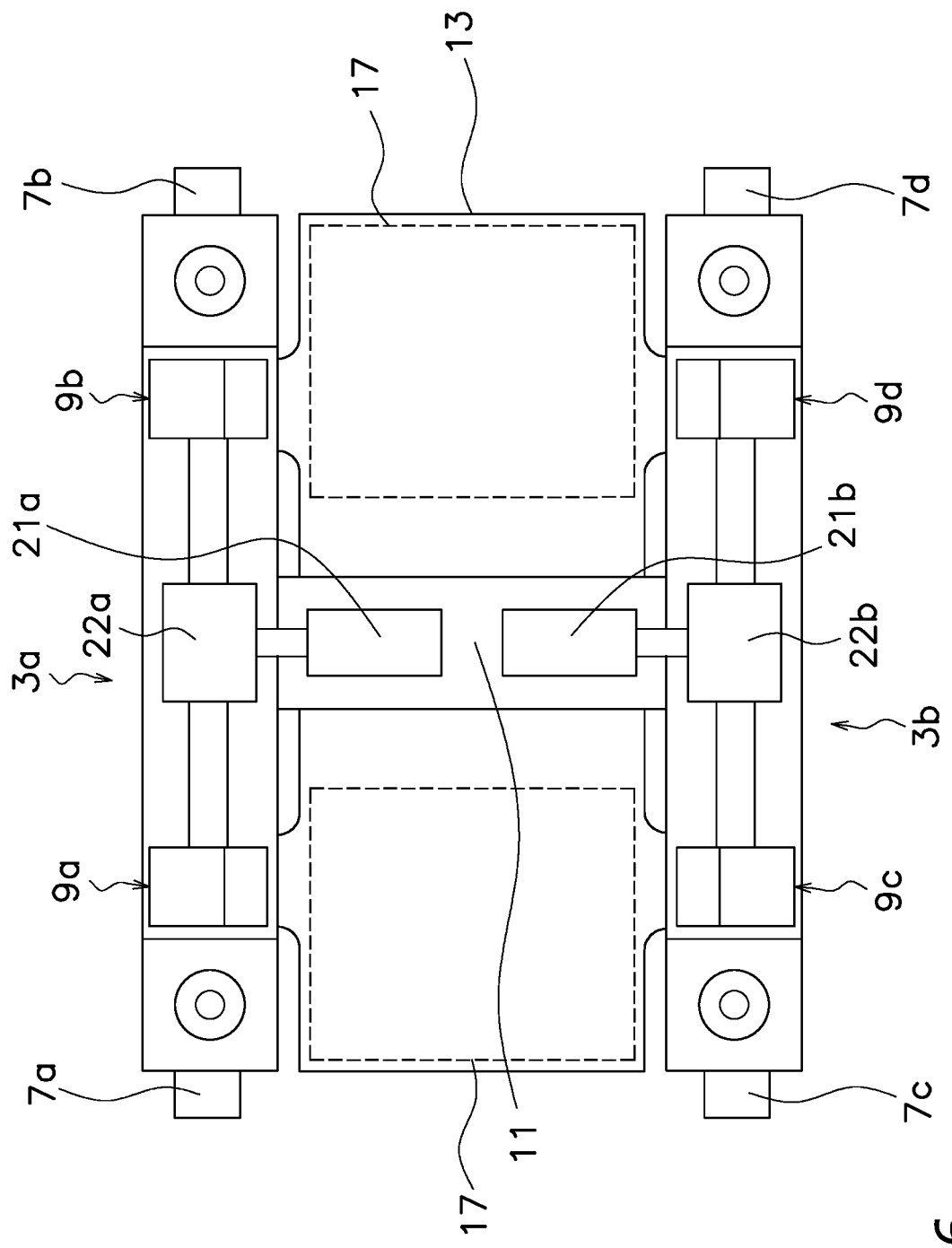
FIG. 6 is a schematic plain view of a relationship between the frame and the electrical components.
Figure 7:
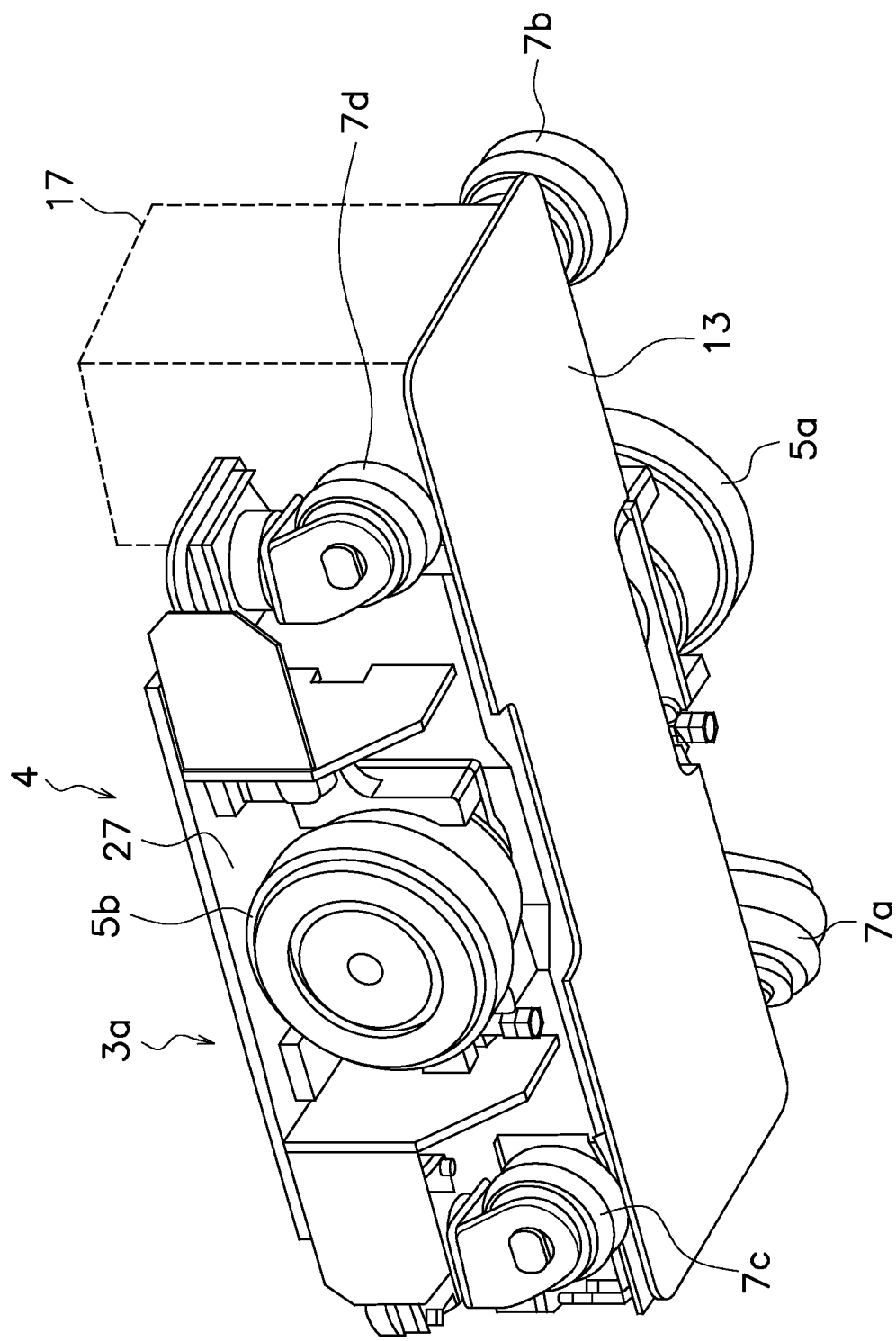
FIG. 7 is a schematic perspective view of the lower frame attached to the vehicle body frame, viewed from below.
Figure 8:
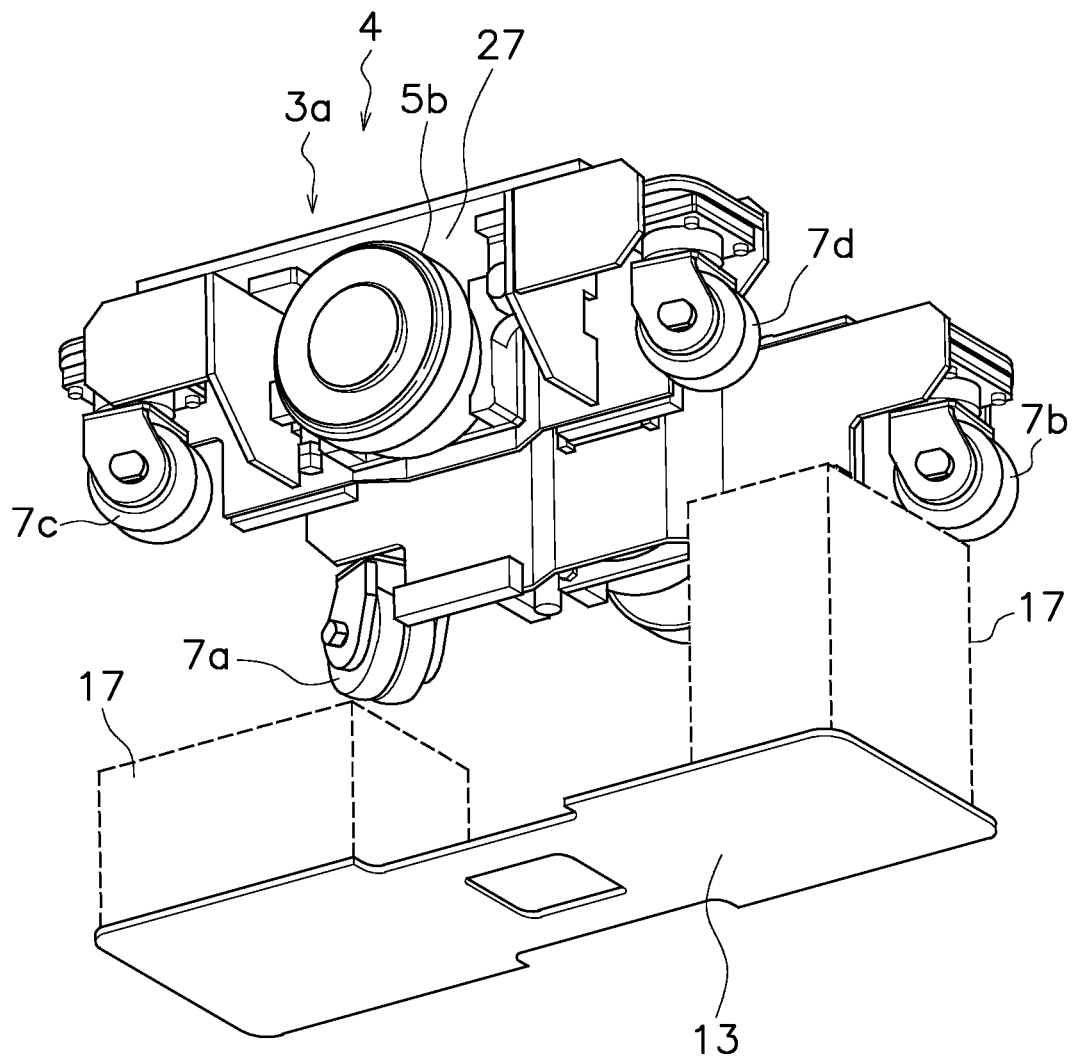
FIG. 8 is a schematic perspective view of the lower frame detached from the vehicle body frame, viewed from below.

Referring to FIGS. 6 through 8, a layout of the electrical components 17 will be explained. FIG. 6 is a schematic plain view of a relationship between the frame and the electrical components. FIG. 7 is a schematic perspective view of the lower frame attached to the vehicle body frame, viewed from below. FIG. 8 is a schematic perspective view of the lower frame detached from the vehicle body frame, viewed from below.

As shown in FIG. 6, the electrical components 17 are located at positions different from that of the connection frame 11 in planar view. Accordingly, as shown in FIG. 7, it is possible to position the electrical components 17 at the same level with the main body 27 of the vehicle body frames 3a, 3b and the connection frame 11 (both are overlapped viewed from the side), thereby making the transport vehicle 1 compact in the height direction.

Next, an operation of detaching the lower frame 13 from the pair of right and left vehicle body frames 3a, 3b will be explained. When the vehicle body frames 3a, 3b are lifted, as shown in FIG. 8, the lower frame 13 leaves below as an integral member itself from the pair of right and left vehicle body frames 3a, 3b. As described above, since the vehicle body frames 3a, 3b and the lower frame 13 constitute the dividing structure, the lower frame 13 and the electrical components 17 can be detached below from the vehicle body frames 3a, 3b with one action. In other words, the maintainability is improved. When the assembly work is performed, a process for the vehicle body frames 3a, 3b and a process for the lower frame 13 can be performed in parallel, thereby shortening the manufacturing time. Furthermore, the lower frame 13 and the electrical components 17 can be detached as an integral member, it is easy to process wirings.

2. Features of the Example

The above-described example can be explained as below.

The transport vehicle 1 (one example of the transport vehicle) includes a pair of right and left vehicle body frames 3a, 3b (one example of the vehicle body frames), driving wheels 5a through 5b (one example of the driving wheels), auxiliary wheels 7a through 7d (one example of the auxiliary wheels), lifter mechanisms 9a through 9d (one example of the lifter mechanisms).

The pair of right and left vehicle body frames 3a, 3b extend forward and backward in the first direction (one example of the front and back direction).

The driving wheels 5a, 5b are disposed in middle portions in the first direction of the vehicle body frames 3a, 3b.

The auxiliary wheels 7a through 7d are disposed at lower portions of end portions in the first direction of the vehicle body frames 3a, 3b.

The lifter mechanisms 9a through 9d are disposed at upper portions of end portions in the first direction of the vehicle body frames 3a, 3b.

According to the transport vehicle 1, positions on which the lifter mechanisms 9a through 9d are placed are the vehicle body frames 3a, 3b, which support the driving wheels 5a, 5b and the auxiliary wheels 7a through 7d. Accordingly, it is possible to integrate the lifter mechanism 9a with the vehicle body frames 3a, 3b, thereby downsizing and lightening the transport vehicle 1.

According to the transport vehicle 1, since the lifter mechanisms 9a through 9d and the auxiliary wheels 7a through 7d are respectively provided at the end portions in the first direction of the vehicle body frames 3a, 3b, the lifter mechanisms 9a through 9d are provided in the vicinity of the auxiliary wheels 7a through 7d, respectively. Accordingly, the heavy load is unlikely to be applied to a portion other than the end portions of the vehicle body frames 3a, 3b, thereby downsizing and lightening the transport vehicle 1.

3. Other Examples

One example was explained above, but this disclosure is not limited to that example, and various modifications are possible within a scope that does not depart from the spirit of the disclosure. In particular, the examples and modified examples disclosed herein can be arbitrarily combined as needed.

(1) Modifications of the Frames

Although the pair of right and left frames and the connection frame are integral with welding, for example, in the first example, they may be independent members fixed to each other as long as they are connected firmly to each other.

Although the connection frame connects the middle portions of the pair of right and left vehicle body frames to each other in the first example, the position of the connection frame is not limited as long as the upper face of the vehicle body frame has an opening. In other words, the pair of right and left vehicle body frames may be connected to each other through the connection frame, between the front ends in the first direction thereof, between the back ends in the first direction thereof, or between both thereof.

Although the whole of the lower frame leaves below from the vehicle body frame in the first example, the lower frame may be divided in the first direction so that the lower frame can be removed from the vehicle body frames by taking out forward and backward. In this example, the work is easy because it is not necessary to lift the transport vehicle main body. The lower frame may be a thick plate member, not a thin plate.

(2) Modifications of the Elevating Motors

Although each of the elevating motor is provided for the two lifter mechanisms in the first example, each of the elevating motors may be provided for one lifter mechanism. Although a plurality of elevating motors are provided in the first example, one elevating motor may drive all of the lifters.

(3) Modifications of the Lifter Mechanisms

Although the lifter mechanism utilizes the rack and pinion in the first example, other structures may be used as long as it is able to elevate an article. In other words, the lifter may utilize a ball screw, a cylinder, or other elevating mechanisms. Although the elevating motors are provided on the connect frame in the first example, the elevating motors may be provided on the vehicle body frame.

(4) Modifications of the Auxiliary Wheels

Although the number of the auxiliary wheels is four in the first example, a pair of auxiliary wheels may be located at the front position and the back position.

The invention claimed is:

1. A transport vehicle comprising:
   a pair of left and right vehicle body frames extending in a front and back direction;
   driving wheels, each of which is disposed at a middle portion in the front and back direction of the pair of left and right vehicle body frames;
   auxiliary wheels, each of which is disposed at a lower portion of an end portion in the front and back direction of each of the right and left vehicle body frames;
   lifter mechanisms, each of which is disposed at an upper portion of an end portion in the front and back direction of each of the right and left vehicle body frames;
   a connection frame connecting upper portions of the pair of right and left vehicle body frames to each other; and
   a lower frame disposable between the pair of right and left vehicle body frames, the lower frame being removably fixed at lower portions of the pair of right and left vehicle body frames,
   wherein each of the vehicle body frames includes a main portion that carries the lifter mechanisms, and a reinforcement portion extending below from the main body.

2. The transport vehicle according to claim 1, further comprising an electrical component disposed at an upper face of the lower frame, the electrical component being located at a position different from that of the connection frame in planar view.

3. The transport vehicle according to claim 1, wherein the connection frame connects middle portions in the front and back direction of the pair of right and left vehicle body frames to each other.

4. The transport vehicle according to claim 3, wherein each of the lifter mechanisms includes:
   an elevating motor disposed at an upper portion of each of the right and left vehicle body frames or the connection frame;
   an elevating transmission shaft that is elevated by driving the elevating motor; and
   a bearing that movably supports the elevating transmission shaft in the vertical direction.

5. The transport vehicle according to claim 4, further comprising an electrical component disposed at an upper face of the lower frame, the electrical component located at a position different from that of the connection frame in planar view.

6. The transport vehicle according to claim 5, wherein the lower frame can be removed below to leave as one member from the pair of right and left vehicle body frames.

7. The transport vehicle according to claim 1, wherein each of the lifter mechanisms includes:
   an elevating motor disposed at an upper portion of each of the right and left vehicle body frames or the connection frame;
   an elevating transmission shaft that is elevated by driving the elevating motor; and
   a bearing that movably supports the elevating transmission shaft in the vertical direction.

8. The transport vehicle according to claim 7, further comprising an electrical component disposed at an upper face of the lower frame, the electrical component located at a position different from that of the connection frame in planar view.

9. The transport vehicle according to claim 7, wherein the lower frame can be removed below to leave as one member from the pair of right and left vehicle body frames.

10. The transport vehicle according to claim 1, wherein the lower frame can be removed below to leave as one member from the pair of right and left vehicle body frames.

11. The transport vehicle according to claim 3, further comprising an electrical component disposed at an upper face of the lower frame, the electrical component located at a position different from that of the connection frame in planar view.

12. The transport vehicle according to claim 11, wherein the lower frame can be removed below to leave as one member from the pair of right and left vehicle body frames.

* * * * *